United States Patent
Ruess et al.

(10) Patent No.: US 9,211,815 B2
(45) Date of Patent: Dec. 15, 2015

(54) LONGITUDINALLY ADJUSTABLE VEHICLE SEAT

(75) Inventors: Georg Ruess, Oberarnbach (DE); Karl Utzinger, Weselberg (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 95 days.

(21) Appl. No.: 14/123,974

(22) PCT Filed: May 23, 2012

(86) PCT No.: PCT/EP2012/002190
§ 371 (c)(1),
(2), (4) Date: Dec. 5, 2013

(87) PCT Pub. No.: WO2012/175166
PCT Pub. Date: Dec. 27, 2012

(65) Prior Publication Data
US 2014/0117734 A1    May 1, 2014

(30) Foreign Application Priority Data
Jun. 21, 2011   (DE) ............ 20 2011 102 248 U

(51) Int. Cl.
*F16M 13/00*    (2006.01)
*B60N 2/08*    (2006.01)

(52) U.S. Cl.
CPC .......... *B60N 2/08* (2013.01); *B60N 2/0818* (2013.01); *B60N 2/0881* (2013.01)

(58) Field of Classification Search
CPC ...... B60N 2/08; B60N 2/0812; B60N 2/0825; B60N 2/0831; B60N 2/0837; B60N 2/085; B60N 2/0881
See application file for complete search history.

(56) References Cited

U.S. PATENT DOCUMENTS

| 8,001,869 | B2 * | 8/2011 | Kanda | B60N 2/0818 74/491 |
| 2004/0232750 | A1 * | 11/2004 | Rohee | B60N 2/08 297/334 |
| 2009/0178508 | A1 * | 7/2009 | Kanda | B60N 2/0818 74/491 |
| 2011/0024595 | A1 * | 2/2011 | Oi et al. | B60N 2/0705 248/429 |

FOREIGN PATENT DOCUMENTS

| DE | 100 50 959 A1 | 5/2002 |
| DE | 10 2005 044778 B4 | 7/2007 |
| DE | 10 2006 021884 B3 | 10/2007 |
| DE | 10 2009 022979 B3 | 8/2010 |
| DE | 10 2010 014 394 A1 | 10/2011 |
| FR | 2 829 974 A1 | 3/2003 |
| FR | 2 885 561 A1 | 11/2006 |

* cited by examiner

*Primary Examiner* — Christopher Garft
(74) *Attorney, Agent, or Firm* — McGlew and Tuttle, P.C.

(57) ABSTRACT

A longitudinally adjustable vehicle seat (I) has, on both sides, a first seat rail (2) fixed to the seat and a second seat rail (3) which guides the first seat rail and is fixed to the vehicle structure. A locking device (4) releaseably locks the seat longitudinal position by securing the first seat rail (2) in the second seat rail (3). A lever (5) is provided that can be pivoted about a pivot axis (S) and has two actuating ends (6) that interact with the locking devices (4). At least one of the actuating ends (6) is spanned by a sub region of a multifunctional part (8). The part (8) both forms a kick plate and also limits the movement of the actuating end (6) upward and therefore forms a safeguard against erroneous operation of the lever (5).

13 Claims, 3 Drawing Sheets

LONGITUDINALLY ADJUSTABLE VEHICLE SEAT

CROSS REFERENCE TO RELATED APPLICATIONS

This application is a U.S. National Phase Application of International Application PCT/EP2012/002190 filed May 23, 2012 and claims the benefit of priority under 35 U.S.C. §119 of German Utility Model DE 20 2011 102 248.3 filed Jun. 21, 2011, the entire contents of which are incorporated herein by reference.

FIELD OF THE INVENTION

The invention relates to a longitudinally adjustable vehicle seat which on both sides has a first seat rail fixed to the seat, a second seat rail which guides said first rail and is fixed to the vehicle structure, a locking device for releaseably locking the longitudinal position of the seat by means of securing the first seat rail in the second rail, and a lever which can be pivoted about a pivot axis and has two actuating ends which interact with the locking devices.

BACKGROUND OF THE INVENTION

DE 10 2006 021 884 B3 discloses longitudinally adjustable vehicle seats in which the seat rail locking mechanism can be unlocked by means of a lever, which can be pivoted about a pivot axis, in conjunction with actuating ends arranged above the seat rail pairs. These actuating ends act during an actuation of the lever, which occurs by raising the handle arranged on the seat front side below the vehicle seat, as a result of a pivoting movement about the pivot axis from above on corresponding actuating elements of the seat rail locking mechanism.

In order to protect the seat rail locking mechanism from being unintentionally released as a result of treading on an actuating end, it is known to provide a step guard which spans the actuating end at a distance and protects it from loading from above.

SUMMARY OF THE INVENTION

An object on which the invention is based is to improve a vehicle seat of the type mentioned at the outset.

According to the invention, a longitudinally adjustable vehicle seat has, on both sides, a first seat rail fixed to the seat, a second seat rail which guides said first seat rail and is fixed to the vehicle structure, a locking device for releaseably locking the longitudinal position of the seat by means of securing the first seat rail in the second seat rail, and a lever which can be pivoted about a pivot axis and has two actuating ends which interact with the locking devices. At least one of the actuating ends is spanned by a subregion of a multifunctional part which forms both a step guard and also limits a movement of the actuating end upward and thus forms a safeguard against erroneous operation of the lever.

Owing to the fact that the step guard both protects the actuating end and also limits a movement of the actuating and upward and thus forms a safeguard against erroneous operation of the lever, the user's safety of the vehicle seat can be increased. Particularly with three-door vehicles having an easy entry function, a movement limitation of the actuating end in the upward direction is appropriate so that an activating device for a memory device, as disclosed, for example, in DE 10 2009 022 979 B3 or DE 10 2005 044 778 B4, is not damaged. Of course, the step guard can also be used in other vehicles, such as in five-door vehicles.

The weight of the step guard can be kept low as a result of a subregion being formed by a bend region.

Particularly preferably, the lever is pivotably mounted in a bearing bush which is formed by the multifunctional part or is accommodated directly in said bush. As a result, the number of parts required can be reduced and the overall weight can be lowered. Moreover, fewer connections to the first seat rail are required.

Particularly preferably, a transverse tube is part of the lever, wherein an end of the transverse tube is accommodated in the bearing bush.

If the bearing bush is formed separately from the multifunctional part and positively accommodated in a bearing opening formed in the multifunctional part, said bush is preferably introduced into the bearing opening from the side of the vehicle seat center longitudinal plane. This installation direction ensures that it is correctly installed and is held in the bearing opening.

The multifunctional part preferably has a basic body which extends substantially in the z-direction and has said bend region and two regions extending from the bend region, wherein the two regions extend in the vehicle seat longitudinal direction, being particularly preferably aligned with one another.

The multifunctional part advantageously has a basic body which has a front end region which extends in the transverse direction. Likewise, the multifunctional part advantageously has a basic body which has a rear end region which extends in the transverse direction.

The front end region and/or the rear end region advantageously extend as far as the outer-side end of a planar surface of the first seat rail.

The multifunctional part preferably has a basic body with a lower lateral lug which extends in the x-y plane, perpendicularly from the basic body. Particularly preferably, an interruption is provided in a part of the bend region, which interruption extends into basic body, wherein the actuating end of the lever projects through this interruption, and the side of the basic body which is formed by the interruption forms a stop which limits the movement of the actuating end upward. The interruption preferably extends into the basic body, in particular as far as the center thereof.

The multifunctional part preferably has a basic body with an upper lateral lug which extends in the x-y plane, perpendicularly from the basic body. This lug forms a type of step surface and protects the actuating region of the lever and thus the seat rail locking mechanism from being released unintentionally.

The two legs of the bend region preferably form an angle of at most 90° between them. The angle is particularly preferably about 60°.

The corner region of the bend region particularly preferably projects laterally beyond the first seat rail.

In particular, the bend region crosses, in a plan view, the curved transition region of the lever to the actuating end in a central region. This allows relatively small torsional forces which act on the lever, wherein the lever arm is as large as possible in order to counter the force pressing the front end of the lever downward.

The multifunctional part advantageously forms a bridge in a bend region, which bridge span a curved transition region of the lever to the actuating end. The bridge here advantageously has a planar surface which extends in the x-y plane.

A damping element is particularly advantageously arranged on the upper side of the curve transition region of the lever to the actuating end and/or the lower side of the bridge in the contact region.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
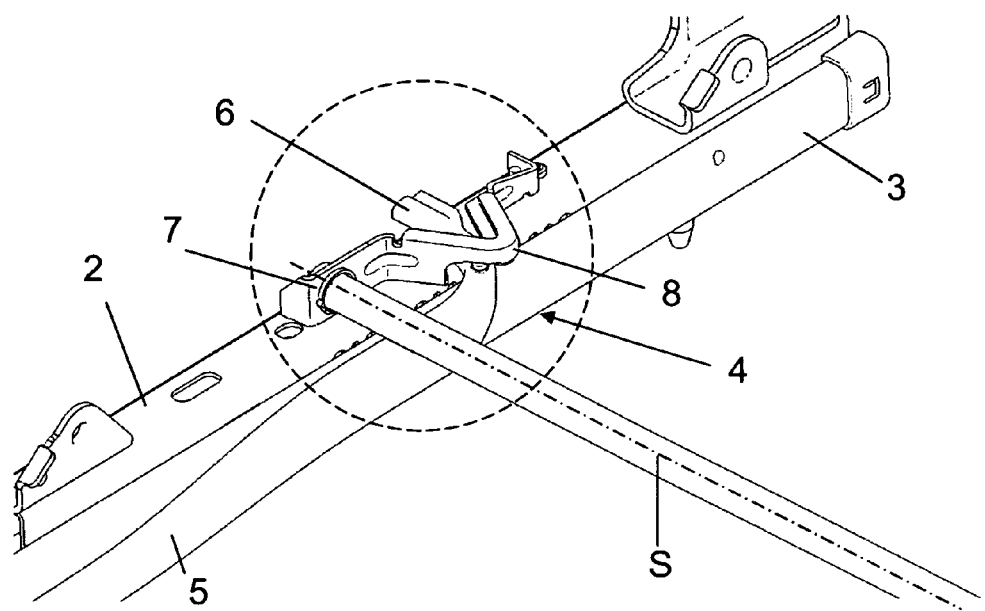
FIG. 1 is a perspective view of a multifunctional part mounted on a locked seat rail pair.

Referring to the drawings in particular, a vehicle seat 1 for a front seat row of a three-door motor vehicle is provided in the exemplary embodiment, wherein the arrangement of the vehicle seat 1 within the motor vehicle and its customary direction of travel define the direction specifications used below. The seat longitudinal direction x extends generally parallel to the direction of travel. The transverse direction is also denoted as y-direction below and the vertical direction as z-direction.

The vehicle seat 1 has on each of both sides a first seat rail 2 fixed to the seat and a second seat rail 3 fixed to the vehicle structure, which rails—according to DE 10 2006 021 884 B3, whose disclosure is expressly incorporated herein—form two seat rail pairs. The seat rail pairs each have a locking device 4 which is not illustrated in further detail and which in the present case is formed according to the aforementioned DE 10 2006 021 884 B3 or DE 100 50 959 A1, but in principle can also have another design.

In order to unlock the locking device 4 by hand for the purpose of longitudinally adjusting the seat, a lever 5 with a handle is provided. The lever 5 can be designed, for example, as described in DE 10 2006 021 884 B3 or the subsequently published DE 10 2010 014 394 A1. Here, the lever 5 has a pivot axis S formed by a transverse tube which is mounted in the region above the two seat rail pairs, and two bent-off and widened actuating ends 6 which projects beyond the first seat rail 2 and interact with the locking device 4 and, if the lever 5 is actuated, release the seat rail locking mechanism. Here, in the present case, the handle is continuously formed with one of the two actuating ends 6, as illustrated in the drawing.

However, the locking of the seat rails 2, 3 can also take place in another way, wherein, for unlocking, a lever is provided which can be pivoted about a pivot axis S and which has at least one actuating end which extends above a seat rail pair at least in a subregion.

The configuration of the overall seat rail pairs lever arrangement, apart from the arrangements of the part, connected to the handle, of the lever 5 on the transverse tube forming the pivot axis S, has mirror symmetry relative to the vehicle seat center longitudinal plane x-z of the vehicle seat 1, and therefore only one side will be discussed in more detail below.

The transverse tube is mounted on both sides with its end region in a bearing bush 7 which is accommodated in a bent sheet-metal part which is arranged on the first seat rail 2 and which will be referred to below as multifunctional part 8. Given an appropriate design and pairing of materials, the bearing function can also be performed directly by the multifunctional part 8.

The multifunctional part 8, which forms the essence of the present invention, will be discussed in more detail below. The multifunctional part 8 has a basic body 8a extending substantially in the z-direction z, with a V-shaped bent region 8b whose two legs form an angle of somewhat less the 90°, two aligned regions 8c, 8d extending in the longitudinal direction, and two end regions 8e, 8f extending in the transverse direction y, wherein the end regions 8e, 8f extend outwardly, i.e. in the direction of the outer side of the seat. The bent region 8b projects with its corner region laterally beyond the first seat rail toward the outside.

On the rear end region 8f there is provided a lug 8h which is bent out counter to the seat longitudinal direction x and has an opening through which a screw is plugged and connected to the first seat rail 2. In the front region 8c of the multifunctional part 8, a bearing opening 8i is punched out of the sheet metal of the multifunctional part 8 and in the present positively accommodates the bearing bush 7. The bearing bush 7 here is inserted from the transverse tube side into the bearing opening 8i.

A lower lateral lug 8j is provided adjacent to the bearing opening 8i in the region 8c, which lug is bent over by 90° and thus extends in the x-y plane, resulting in a large-area bearing contact with the first seat rail 2. The lower lateral lug 8j follows the profile of the bend region 8b, said lug being interrupted in the region which projects laterally beyond the first seat rail 2 and the interruption extending to approximately the center of the basic body 8a in the z-direction (see FIG. 1), and reaches into the region 8d, adjacent to the rear end region 8f. Here, the width of the lower lateral lug 8j (perpendicular to the basic body 8a) is considerably greater in the regions 8c, 8d than in the bend region 8b. The lower lateral lug 8j has in the present case an opening which likewise serves for fastening on the first seat rail 2, wherein this opening and the front end region 8e accommodate the bearing bush 7 approximately centrally between them.

Figure 3:
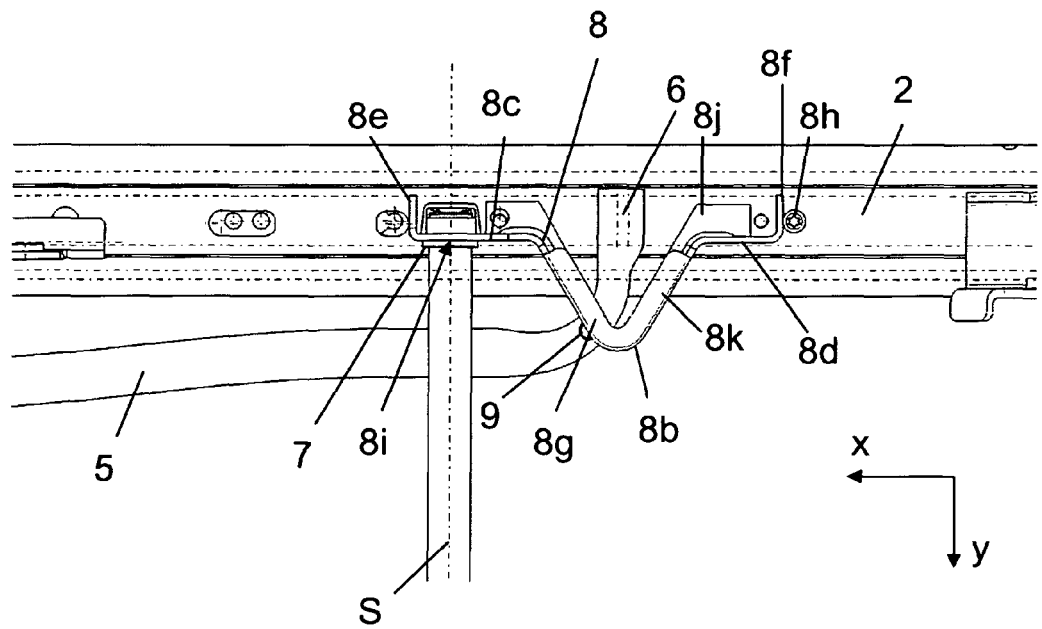
FIG. 3 is a plan view of the illustration of FIG. 1.
Figure 4:
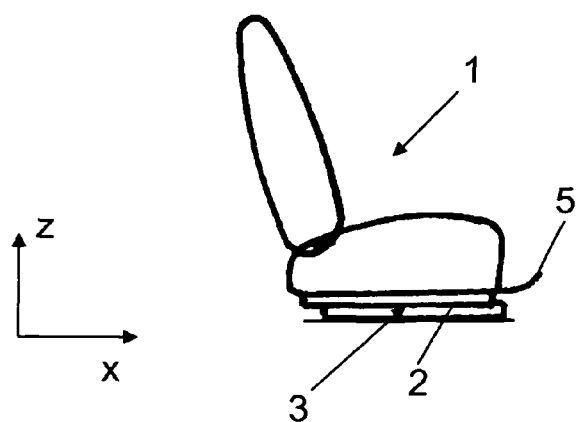
FIG. 4 is a schematic view showing a vehicle seat according to the invention.

An upper lateral lug 8k is further provided in the bend region 8b, the width of which lug corresponds to the lower lateral lug 8j in this region, but which is formed continuously (see FIG. 3). Owing to the interruption provided at the bottom, the upper lateral lug 8k forms a bridge 8g in conjunction with the remaining part of the basic body 8a, wherein the upper side of the bridge is not curved in the present case, but is arranged so as to extend in the x-y plane over the entire length.

A slot-shaped bead 8l which has reinforcing purposes is in each case provided centrally in the basic body 8a in the transition region between the front region 8c and the bend region 8b and also the rear region 8d and the bend region 8b. Furthermore, for production-related reasons, a stress-relief notch 8m is provided on the front and rear end of the upper lateral lug 8k.

The multifunctional part 8 has—in addition to the bearing function for the transverse tube—two further functions. Thus, the bend region 8b protects the actuating end 6 of the lever 5, which end—on the side illustrated in the drawing as an extension of the handle which is guided past the bottom of the transverse tube—is bent outwardly, extends directly, after its offset, under the bend region 8b of the multifunctional part and ends on the outer side of the first seat rail 2. The fact that the actuating end 6 of the lever 5 extends under the bend region 8b means that it is protected, i.e. the bend region 8b forms a step guard for the actuating end 6.

Figure 2:
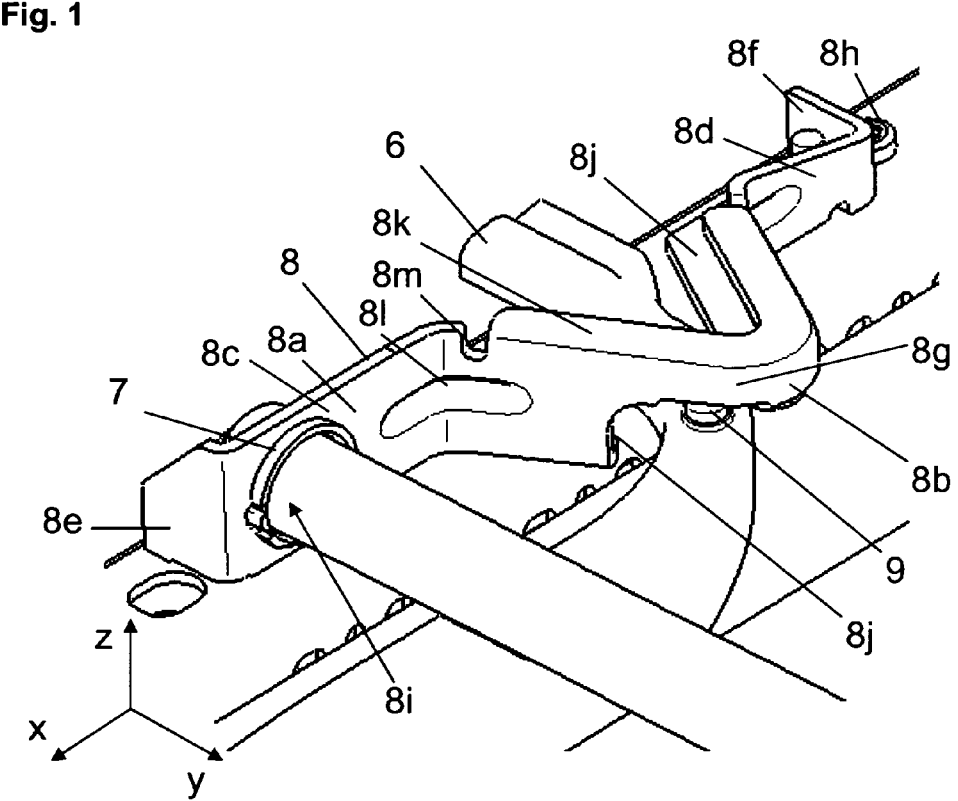
FIG. 2 is a detail illustration of the multifunctional part mounted on a locked seat rail pair of FIG. 1.
Figure 2A:
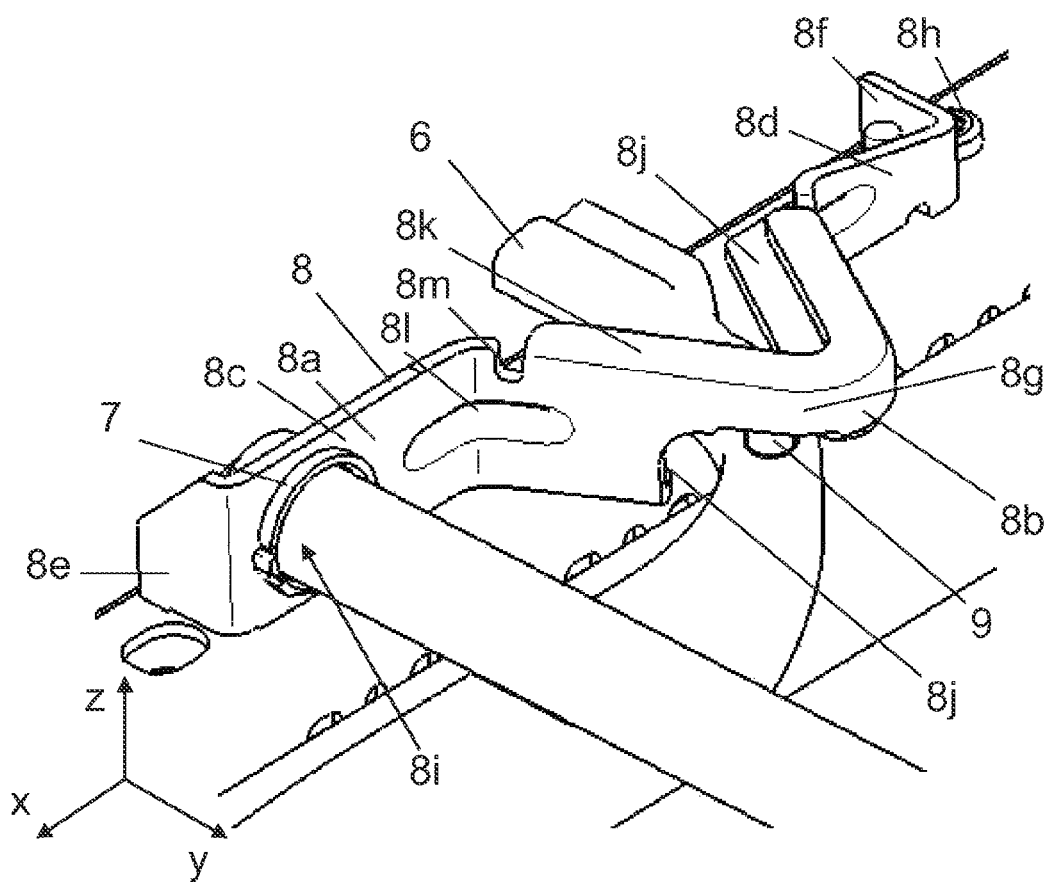
FIG. 2a is another detail illustration of the multifunctional part mounted on a locked seat rail pair of FIG. 1.

Furthermore, the bend region 8b forms a stop in the region of the interruption of the lower lug 8j, which stop limits the movement of the actuating end 6 upward, i.e. the handle cannot be pressed downward to any desired extent, but the movement is limited by the multifunctional part 8, with the result that the lever 5 is protected from an erroneous operation. Here, for movement limitation in the upward direction, the curved transition region to the actuating end 6 impinges on the projecting corner region of the bend region 8b of the multifunctional part 8 (see FIG. 3). In order to damp an impact which may occur, a damping element 9, for example a rubber buffer or a foam element, is mounted on the lever 5 in the transition region to the actuating end 6. In principle, the damping element can also be arranged on the lower side of the bridge 8g (see FIG. 2a). In order to be able to support the relatively large forces possibly occurring, the two end regions 8e, 8f are provided, which reach as far as the end of the flat surface of the first seat rail 2 (see FIG. 3), with the result that the whole rail width is used.

Although the multifunctional part 8 has been described by way of a bent sheet metal part, another way of producing the multifunctional part 8 is also possible, in particular by means of injection molding.

Furthermore, in the present case, the multifunctional part 8 is mounted on the first seat rail 2 by means of two screws. However, this can also take place by means of welding or in some other suitable manner.

The features disclosed in the above description, the claims and the drawings may be of importance both individually and in combinations for the implementation of the invention in its various configurations.

While specific embodiments of the invention have been shown and described in detail to illustrate the application of the principles of the invention, it will be understood that the invention may be embodied otherwise without departing from such principles.

The invention claimed is:

1. A longitudinally adjustable vehicle seat comprising:
   a seat part;
   a first seat rail fixed to the seat part;
   a second seat rail which guides said first seat rail and is fixed to a vehicle structure;
   a locking device for releasably locking the longitudinal position of the seat by means of securing the first seat rail in the second seat rail;
   a lever that is pivotable about a pivot axis, the lever having two actuating ends which interact with the locking devices; and
   a multifunctional part, wherein at least one of the two actuating ends is spanned by a subregion of the multifunctional part forming both a step guard and also limiting a movement of the actuating end upward and forming a safeguard against erroneous operation of the lever, wherein the vehicle seat is in a vehicle with a seat longitudinal direction extending generally parallel to the direction of travel that is a x-direction, a transverse direction of the seat that is a y-direction and a vertical direction that is a z-direction, the x-direction and the y-direction defining an x-y plane, wherein the multifunctional part has a basic body with a bend region, and a lower lateral lug is provided which, extending beyond the bend region, extends in the x-y plane, perpendicularly from the basic body, wherein the lower lateral lug has an interruption in a part of the bend region, which interruption extends in the z-direction into the basic body, wherein the actuating end of the lever projects through this interruption, and the side of the basic body which is formed by the interruption forms a stop which limits the movement of the actuating end upward.

2. The vehicle seat as claimed in claim 1, wherein the subregion spanning the actuating end is formed by a bend region of the multifunctional part.

3. The vehicle seat as claimed in claim 1, wherein:
   the multifunctional part forms a bearing bush; and
   the lever is pivotably mounted in the bearing bush which is formed by the multifunctional part or is directly accommodated in said bearing bush.

4. The vehicle seat as claimed in claim 3, wherein a transverse tube is part of the lever, wherein an end of the transverse tube is accommodated in the bearing bush.

5. The vehicle seat as claimed in claim 1, further comprising a bearing bush formed separately from the multifunctional part and positively accommodated in a bearing opening formed in the multifunctional part, wherein said bearing bush is introduced into the bearing opening from a side of a vehicle seat longitudinal center plane.

6. The vehicle seat as claimed in claim 1, wherein:
   the vehicle seat is in a vehicle with a seat longitudinal direction extending generally parallel to the direction of travel that is a x-direction, a transverse direction of the seat that is a y-direction and a vertical direction that is a z-direction; and
   the multifunctional part has a basic body which extends substantially in the z-direction and has a bend region and two regions extending from the bend region, wherein the two regions extend in a vehicle seat longitudinal direction.

7. The vehicle seat as claimed in claim 6, wherein the two regions are aligned with one another.

8. The vehicle seat as claimed in claim 1, wherein:
   the basic body has an upper lateral lug which extends in the x-y plane, perpendicularly from the basic body.

9. The vehicle seat as claimed in claim 1, wherein the interruption in the z-direction extends up to a center of the basic body.

10. The vehicle seat as claimed in claim 1, wherein: the multifunctional part has a basic body with a bend region with two legs that form an angle of at most 90° between each other.

11. The vehicle seat as claimed in claim 1, wherein the multifunctional part has a basic body with a bend region with a corner region that projects laterally beyond the first seat rail.

12. The vehicle seat as claimed in claim 1, wherein the multifunctional part forms a bridge in a bend region, which bridge spans a curved transition region of the lever to the actuating end.

13. The vehicle seat as claimed in claim 12, wherein a damping element is arranged on the upper side of the curved transition region of the lever to the actuating end or the lower side of the bridge in a contact region, where the bridge and the curved transition region are overlapping.

* * * * *